(12) United States Patent
Lin et al.

(10) Patent No.: US 11,247,543 B1
(45) Date of Patent: Feb. 15, 2022

(54) FULLY-EMBEDDED VEHICLE COVER

(71) Applicant: Hangzhou Golden Sun Auto Parts Co., LTD., Hangzhou (CN)

(72) Inventors: Chenshan Lin, Hangzhou (CN); Shaoyong Zheng, Hangzhou (CN); Jinqin Fu, Hangzhou (CN); Xue'e Wang, Hangzhou (CN); Xiaohong Tang, Hangzhou (CN)

(73) Assignee: Hangzhou Golden Sun Auto Parts Co., LTD., Hangzhou (CN)

( * ) Notice: Subject to any disclaimer, the term of this patent is extended or adjusted under 35 U.S.C. 154(b) by 0 days.

(21) Appl. No.: 17/139,368

(22) Filed: Dec. 31, 2020

(30) Foreign Application Priority Data

Nov. 13, 2020 (CN) .......................... 202011268488.8

(51) Int. Cl.
  *B60J 7/08*  (2006.01)
  *B60J 7/19*  (2006.01)
  *B60J 7/10*  (2006.01)

(52) U.S. Cl.
  CPC .................. *B60J 7/085* (2013.01); *B60J 7/10* (2013.01); *B60J 7/198* (2013.01)

(58) Field of Classification Search
  CPC ..... B60J 7/085; B60J 7/10; B60J 7/198; B60J 7/141; B60J 7/068
  USPC .............................................. 296/98, 100.09
  See application file for complete search history.

(56) References Cited

U.S. PATENT DOCUMENTS

| | | | | |
|---|---|---|---|---|
| 5,251,951 | A * | 10/1993 | Wheatley | B60P 7/04 160/328 |
| 6,948,761 | B2 * | 9/2005 | Haack | B60J 7/102 296/100.16 |
| 8,672,388 | B2 * | 3/2014 | Rusher | B60J 7/085 296/98 |
| 9,211,833 | B2 * | 12/2015 | Rusher | B60P 7/02 |
| 10,300,775 | B2 * | 5/2019 | Spencer | B60J 7/141 |
| 10,611,220 | B2 * | 4/2020 | Spencer | B60J 7/04 |
| 2019/0118629 | A1 * | 4/2019 | Spencer | B60J 7/198 |

FOREIGN PATENT DOCUMENTS

CN  111645501 A  9/2020

* cited by examiner

*Primary Examiner* — Jason S Morrow
(74) *Attorney, Agent, or Firm* — Schwegman Lundberg & Woessner, P.A.

(57) ABSTRACT

A fully-embedded vehicle cover includes at least two mounting rods and a vehicle cover. The mounting rods are parallel to each other. The vehicle cover is laid on the mounting rods. The fully-embedded vehicle cover further includes a front railing and a depressor. The front railing is fixed on the vehicle cover and perpendicular to the mounting rods. The front railing is detachably matched with the mounting rods. The depressor is rotatably mounted on the mounting rods, is parallel to the mounting rod, and cooperates with the mounting rod to clamp the vehicle cover.

10 Claims, 8 Drawing Sheets

FULLY-EMBEDDED VEHICLE COVER

CROSS-REFERENCE TO RELATED APPLICATIONS

This Non-provisional application claims priority under 35 U.S.C. § 119(a) to Chinese Patent Application No. 202011268488.8 filed on Nov. 13, 2020, the entire contents of which are hereby incorporated by reference in their entirety.

TECHNICAL FIELD

The disclosure relates to the field of automobile parts, in particular to a fully-embedded vehicle cover.

BACKGROUND ART

Nowadays, in order to transport goods in rainy and snowy weather, a pickup truck generally is chosen to be installed with a cover on its cargo bed for waterproofing. A fully-embedded vehicle cover used in the cargo bed of the pickup truck is provided in Patent CN111645501A, for which there is a problem during its use that several cover plates of this vehicle cover are pressed against above a rail arrangement with their own gravity, and thus when a severe bumping is encountered, the vehicle cover will shake off from the rail arrangement, which results in a poor stability.

SUMMARY

In view of the above problems, the present disclosure provides a fully-embedded vehicle cover.

Technical schemes adopted in the disclosure is as follows.

A fully-embedded vehicle cover includes at least two mounting rods and a vehicle cover. The mounting rods are parallel to each other. The vehicle cover is laid on the mounting rods. The fully-embedded vehicle cover further includes a front railing and a depressor. The front railing is fixed on the vehicle cover and perpendicular to the mounting rods. The front railing is detachably matched with the mounting rods. The depressor is rotatably mounted on the mounting rods, is parallel to the mounting rod, and cooperates with the mounting rod to clamp the vehicle cover.

In this vehicle cover structure, the front railing is installed on the vehicle cover, and then the front railing is detachably matched with the mounting rods, which means that an end of the vehicle cover is fixed on the mounting rods, and then the vehicle cover is clamped by a joint action of the depressor and the mounting rods, which means the vehicle cover is fixed on the mounting rods, so that it is not easy for the vehicle cover to jump off from the mounting rod.

Optionally, it also includes a fixed bolt, a first slider, a second slider and a locking nut. The first slider is slidably arranged on the front railing. The fixed bolt is arranged on the first slider. The locking nut is matched with the fixed bolt. A sliding hole is defined in the second slider, and the fixed bolt passes through the sliding hole in the second slider. The locking nut abuts against the second slider, and the second slider cooperates with the front railing to clamp the mounting rods.

In this structure, the first slider can slide relative to the front railing and the fixed bolt is fixed on the first slider, while the second slider can slide relative to the fixed bolt. The front railing cooperates with the second slider to clamp the mounting rods, and when the front railing cooperates with the second slider to clamp the mounting rods, the vehicle cover is fixed on the mounting rods which are connected with the cargo bed of a pickup truck. Therefore, in the above structure, a fastening between the vehicle cover and the mounting rods is realized by actions of the first slider, the second slider, the fixed bolt and the locking nut, so that a fastening strength and position between the vehicle cover and the mounting rods can be more conveniently and stably adjusted. Specifically, the fixed bolt is a T-shaped fixed bolt, so that the fixed bolt slides more smoothly.

Optionally, it also includes a buckle, a rubber gasket and a front railing rubber strip. The buckle is fixedly arranged on the front railing. The rubber gasket is arranged on the buckle, and the front railing rubber strip is inserted and fixed on the front railing.

The buckle is set to facilitate fixing the vehicle cover after the vehicle cover is rolled up. The rubber gasket functions to protect the buckle, so as to prevent the buckle from damages caused by an impact of heavy objects. The front railing rubber strip serves to seal and protect against rain.

Optionally, the vehicle cover includes a plurality of profiles, a plurality of connecting rubber strips, an edge rubber strip, a first joint and a second joint. The profiles are rotationally sealed and fixed together through the connecting rubber strips. The edge rubber strip is fixed on the profiles through the first joint and the second joint. The edge rubber strip is perpendicular to the connecting rubber strips, and the connecting rubber strips is parallel to the profiles. The depressor and the mounting rod are used for clamping the first joint and the second joint, and the edge rubber strip is provided with a flat adhesive surface, and the flat adhesive surface is sealed, adhered and fixed with the connecting rubber strips and the profiles.

The edge rubber strip is provided with an L-shaped engaging portion, and the first joint cooperates with the profiles (and connecting rubber strips) to clamp the engaging portion, so that the edge rubber strip is sealed and fixed on the profiles (and connecting rubber strips), with a good sealing performance. In addition, a main structure of the vehicle cover is assembled by the profiles and the connecting rubber strips so as to be capable of rolling up and ensure a good waterproof performance. Specifically, the first joint and the second joint are both provided with grooves, and the first joint and the second joint clamp the L-shaped engaging portion on the edge rubber strip through the grooves.

Optionally, the profile is provided with a fitting groove, the connecting rubber strip is provided with a fitting part, and the fitting part and the fitting groove are sealed and fitted together.

The fitting part is embedded in the fitting groove, and the profile and the connecting rubber strip can be rotated with each other.

Optionally, it also includes a pressing member which is fixed on the depressor, and a torsion spring with its one end directly or indirectly abutting against the pressing member, and the other end of the torsion spring directly or indirectly abutting against the mounting rod.

The pressing member is set to press and adjust the depressor conveniently.

Optionally, it also includes an end cap which is installed on the mounting rod and located at an end of the mounting rod, and the end cap is used for preventing the pressing member and the depressor from slipping off the mounting rod.

Optionally, the end caps are fixedly arranged at two ends of the mounting rod, and two torsion springs are respectively arranged at two ends of the depressor.

Two torsion springs are set to improve a stability of the depressor during rotation. Specifically, an end of the torsion spring can abut against the pressing member or depressor, and the other end of the torsion spring can abut against the mounting rod or the end cap.

Optionally, it also includes a steel wire bar and a stop block. The steel wire bar is fixed on the stop block and is parallel to the depressor and the mounting rod. The stop block is arranged on the mounting rod. The steel wire bar is rotationally clamped between the stop block and the mounting rods.

Specifically, the limit block is slidably clamped on the mounting rod, and can slide over a certain distance on the mounting rod. However, due to a blocking effect of the end cap or the pressing member, the limit block cannot slide out of the mounting rod, thus reducing friction resistance between the steel wire strip and the limit block during rotation of the depressor, and making the depressor rotate more smoothly. Specifically, the mounting rod is also provided with a mounting rubber strip, and when the mounting rod is installed on the cargo bed of the pickup truck, the mounting rubber strip on the mounting rod are closely attached to the cargo bed of the pickup truck.

Optionally, it also includes a lock tongue which is elastically installed on the vehicle cover through a spring, and the lock tongue cooperates with the vehicle cover to clamp the mounting rod.

The lock tongue functions to lock the vehicle cover, so that a cooperation between the vehicle cover and the mounting rod is more stable.

The disclosure presents beneficial effects that: the front railing is installed on the vehicle cover, and then the front railing is detachably matched with the mounting rods, which means that an end of the vehicle cover is fixed on the mounting rods, and then the vehicle cover is clamped by a joint action of the depressor and the mounting rods, which means the vehicle cover is fixed on the mounting rods, so that it is not easy for the vehicle cover to jump off from the mounting rods.

Figure 1:
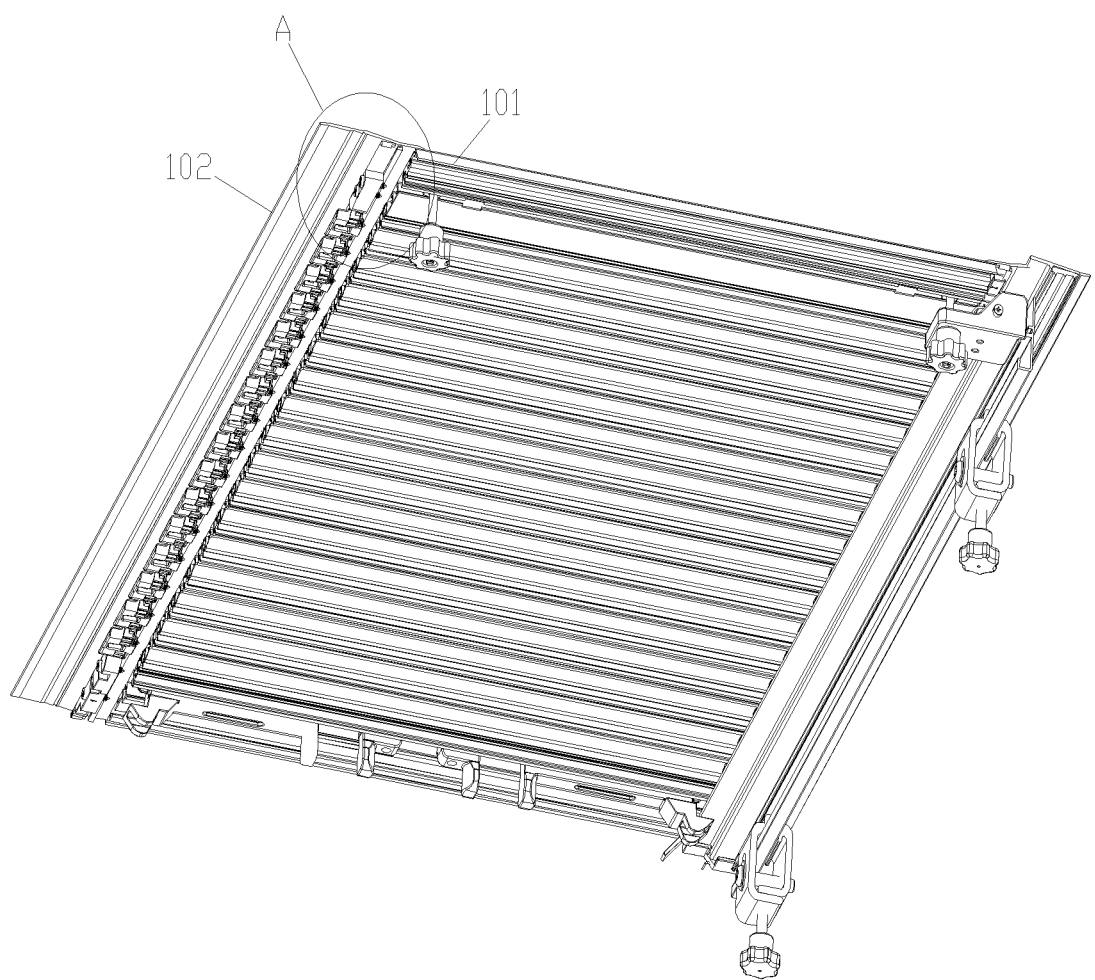
FIG. 1 is a schematic diagram of an installed structure of a waterproof rubber strip of a vehicle cover according to the disclosure.

The reference numerals in the figures are: 101. Profile, 10101. Fitting Groove, 102. Edge Rubber Strip, 10201. Flat Adhesive Surface, 10202. Engaging Portion, 103. Connecting Rubber Strip, 10301. Fitting Part, 104. First Joint, 10401. Lower Edge Surface, 105. Screw, 106. Second Joint, 107. Groove, 201. Mounting Rod, 202. Buckle, 203, Rubber Gasket, 204. Front Railing Rubber Strip, 205. Front Railing, 206. First Slider, 207. Fixed Bolt, 208. Locking Nut, 209. Second Slider, 2010. Sliding Hole, 301. Depressor, 302. End Cap, 303. Torsion Spring, 304. Stop Block, 305, Mounting Rubber Strip, 306. Steel Wire Bar, 307. Pressing Member, 4. Lock Tongue.

DETAILED DESCRIPTION OF PREFERRED EMBODIMENTS

The present disclosure will be described in detail with reference to the accompanying drawings.

As shown in FIGS. 1, 3, 5, 9 and 12, a fully-embedded vehicle cover includes at least two mounting rods 201 and a vehicle cover. The mounting rods 201 are parallel to each other. The vehicle cover is laid on the mounting rods 201. The fully-embedded vehicle cover further includes a front railing 205 and a depressor 301. The front railing 205 is fixed on the vehicle cover and perpendicular to the mounting rods 201. The front railing 205 is detachably matched with the mounting rods 201. The depressor 301 is rotatably mounted on the mounting rods 201, is parallel to the mounting rod 201, and cooperates with the mounting rod 201 to clamp the vehicle cover.

In this vehicle cover structure, the front railing 205 is installed on the vehicle cover, and then the front railing 205 is detachably matched with the mounting rods 201, which means that an end of the vehicle cover is fixed on the mounting rods 201, and then the vehicle cover is clamped by a joint action of the depressor 301 and the mounting rods 201, which means the vehicle cover is fixed on the mounting rods 201, so that it is not easy for the vehicle cover to jump off from the mounting rods 201.

Figure 6:
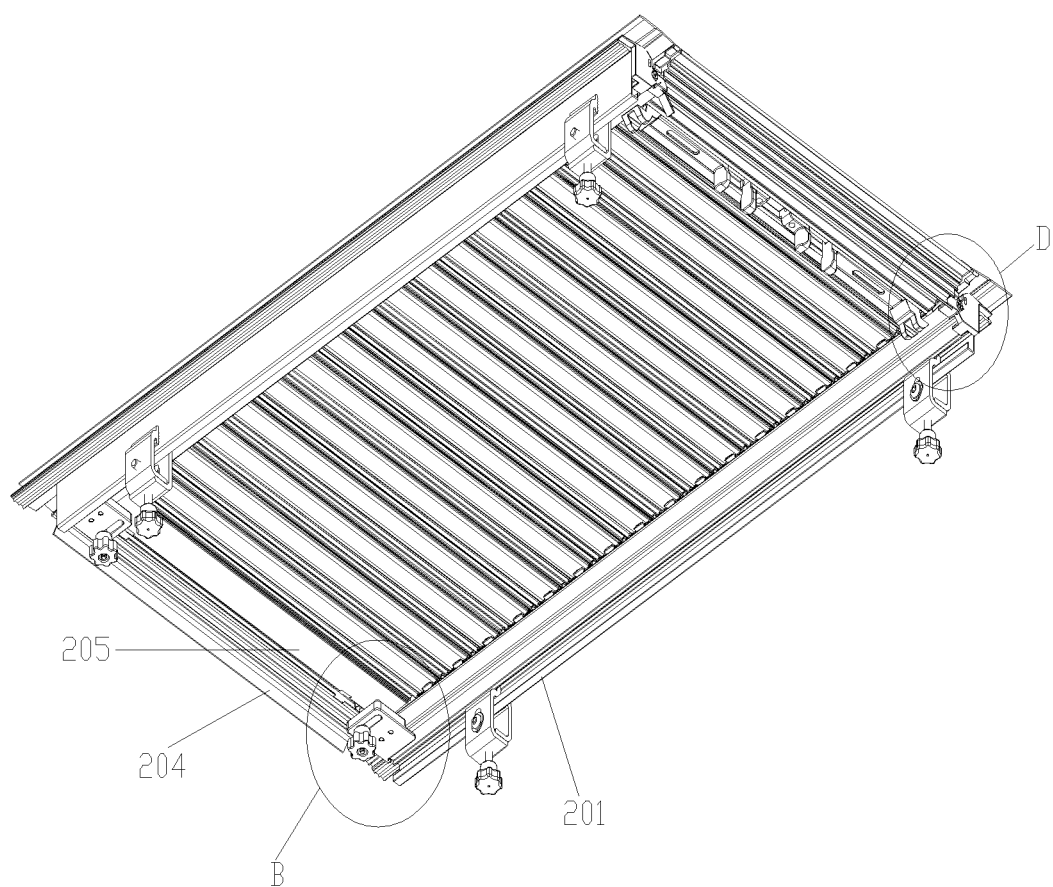
FIG. 6 is a schematic diagram of a fixing and mounting structure for a vehicle cover according to the disclosure.
Figure 7:
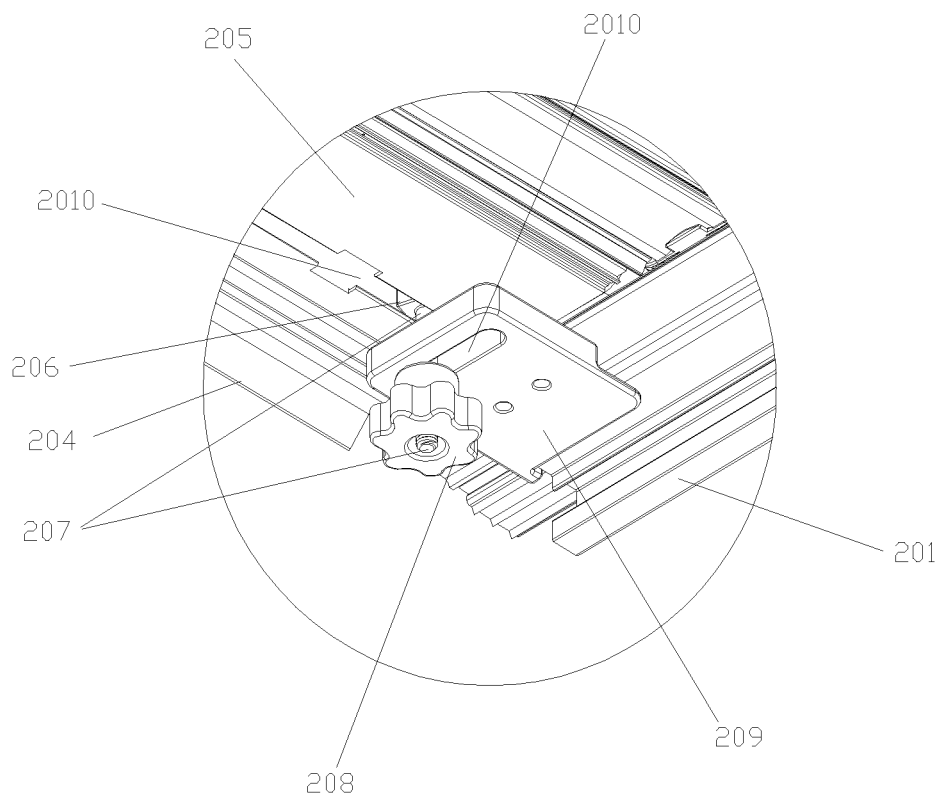
FIG. 7 is an enlarged schematic diagram at B in FIG. 6.

As shown in FIGS. 6 and 7, it also includes a fixed bolt 207, a first slider 206, a second slider 209 and a locking nut 208. The first slider 206 is slidably arranged on the front railing 205. The fixed bolt 207 is arranged on the first slider 206. The locking nut is matched with the fixed bolt 207. A sliding hole 2010 is defined in the second slider 209, and the fixed bolt 207 passes through the sliding hole 2010 in the second slider 209. The locking nut abuts against the second slider 209, and the second slider 209 cooperates with the front railing 205 to clamp the mounting rods 201.

In this structure, the first slider 206 can slide relative to the front railing 205 and the fixed bolt 207 is fixed on the first slider 206, while the second slider 209 can slide relative to the fixed bolt 207. The front railing 205 cooperates with the second slider 209 to clamp the mounting rods 201, and when the front railing 205 cooperates with the second slider 209 to clamp the mounting rods 201, the vehicle cover is fixed on the mounting rods 201 which are connected with the cargo bed of a pickup truck. Therefore, in the above structure, a fastening between the vehicle cover and the mounting rods 201 is realized by actions of the first slider 206, the second slider 209, the fixed bolt 207 and the locking nut 208, so that a fastening strength and position between the vehicle cover and the mounting rods 201 can be more conveniently and stably adjusted. Specifically, the fixed bolt 207 is a T-shaped fixed bolt 207, so that the fixed bolt 207 slides more smoothly.

Figure 9:
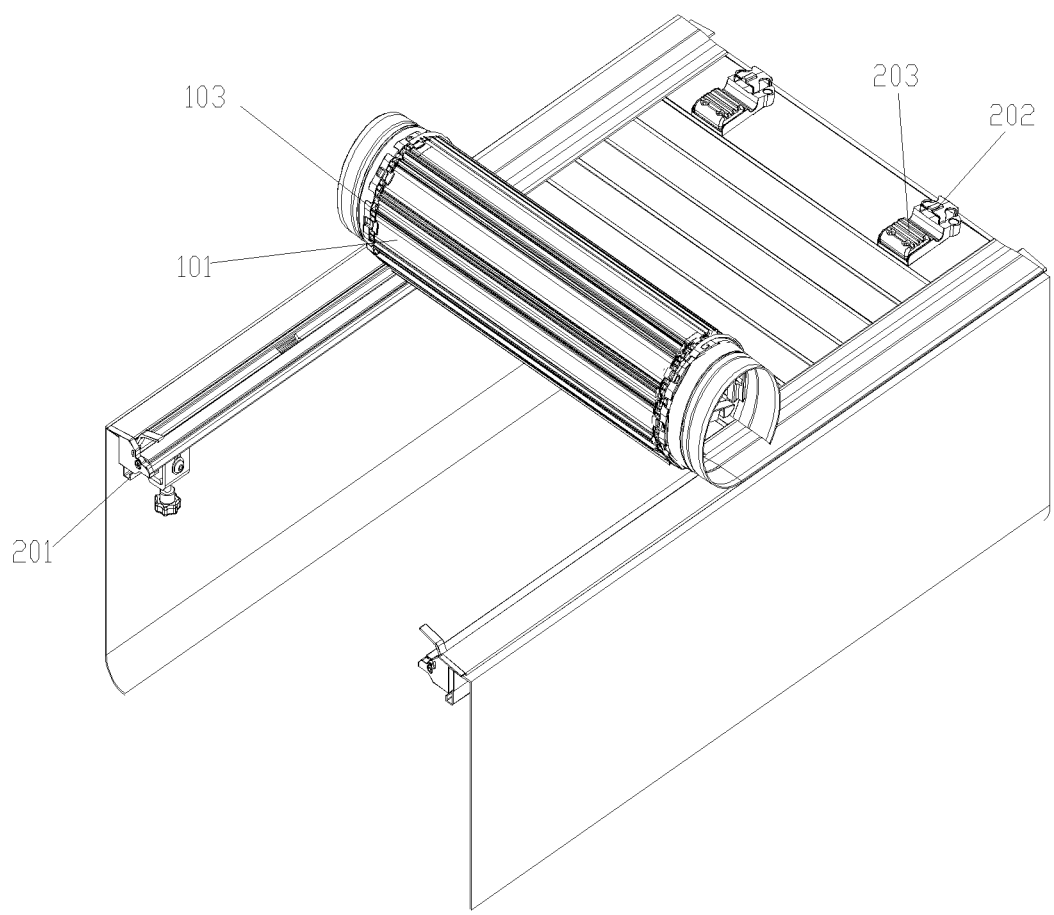
FIG. 9 is a schematic diagram of a positional relationship between the vehicle cover and the mounting rod.

As shown in FIGS. 6 and 9, it also includes a buckle 202, a rubber gasket 203 and a front railing rubber strip 204. The buckle 202 is fixedly arranged on the front railing 205. The rubber gasket 203 is arranged on the buckle 202, and the front railing rubber strip 204 is inserted and fixed on the front railing 205.

The buckle 202 is set to facilitate fixing the vehicle cover after the vehicle cover is rolled up. The rubber gasket 203 functions to protect the buckle 202, so as to prevent the buckle 202 from damages caused by an impact of heavy objects. The front railing rubber strip 204 serves to seal and protect against rain.

As shown in FIGS. 1, 2, 3 and 5, the vehicle cover includes a plurality of profiles 101, a plurality of connecting rubber strips 103, an edge rubber strip 102, a first joint 104 and a second join 106. The profiles 101 are rotationally sealed and fixed together through the connecting rubber strips 103. The edge rubber strip 102 is fixed on the profiles 101 through the first joint 104 and the second joint 106. The edge rubber strip 102 is perpendicular to the connecting rubber strips 103, and the connecting rubber strips 103 is parallel to the profiles 101. The depressor 301 and the mounting rod 201 are used for clamping the first joint 104 and the second joint 106, and the edge rubber strip 102 is provided with a flat adhesive surface 10201, and the flat adhesive surface 10201 is sealed, adhered and fixed with the connecting rubber strips 103 and the profiles 101.

Figure 2:
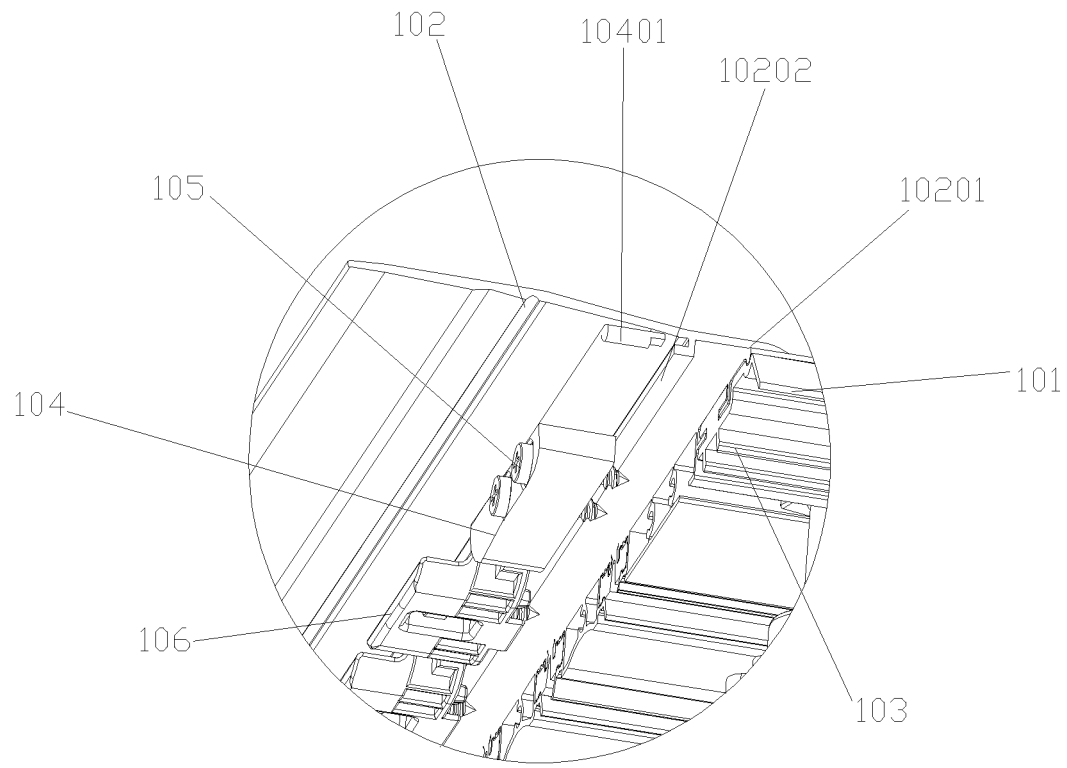
FIG. 2 is an enlarged schematic diagram at A in FIG. 1.
Figure 3:
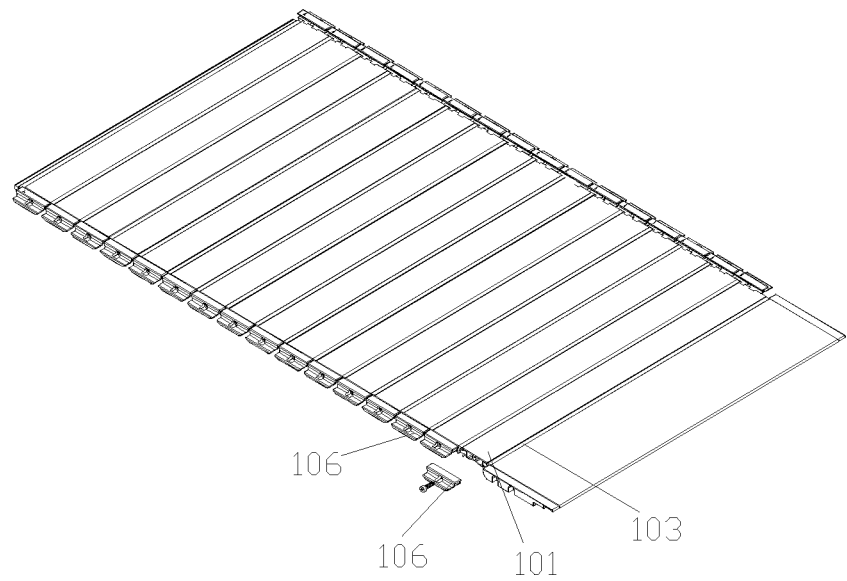
FIG. 3 is a schematic diagram of a connection between a second joint and a vehicle cover according to the disclosure.
Figure 4:
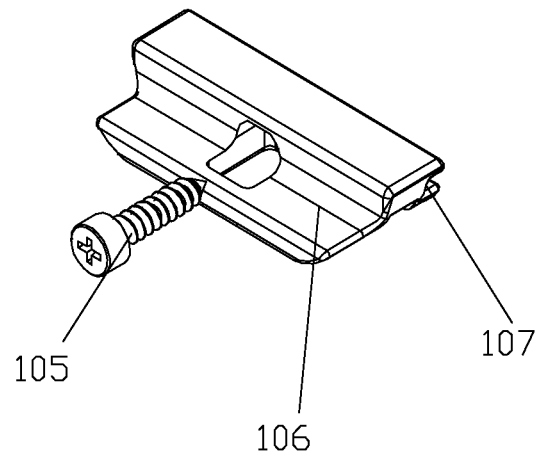
FIG. 4 is a schematic diagram of a structure of a second connection block.

As shown in FIGS. 2, 3 and 4, the edge rubber strip 102 is provided with an L-shaped engaging portion 10202, and the first joint 104 cooperates with the profiles 101 (and connecting rubber strips 103) to clamp the engaging portion 10202, so that the edge rubber strip is sealed and fixed on the profiles 101 (and connecting rubber strips 103), with a good sealing performance. In addition, a main structure of the vehicle cover is assembled by the profiles 101 and the connecting rubber strips 103 so as to be capable of rolling up and ensure a good waterproof performance. Specifically, the first joint 104 and the second joint 106 are both provided with grooves 107, and the first joint 104 and the second joint 106 clamp the L-shaped engaging portion 10202 on the edge rubber strip 102 through the grooves 107. Specifically, the first joint 104 is further provided with a lower edge surface 10401, and the lower edge surface 10401 also abuts against the engaging portion 10202.

Figure 5:
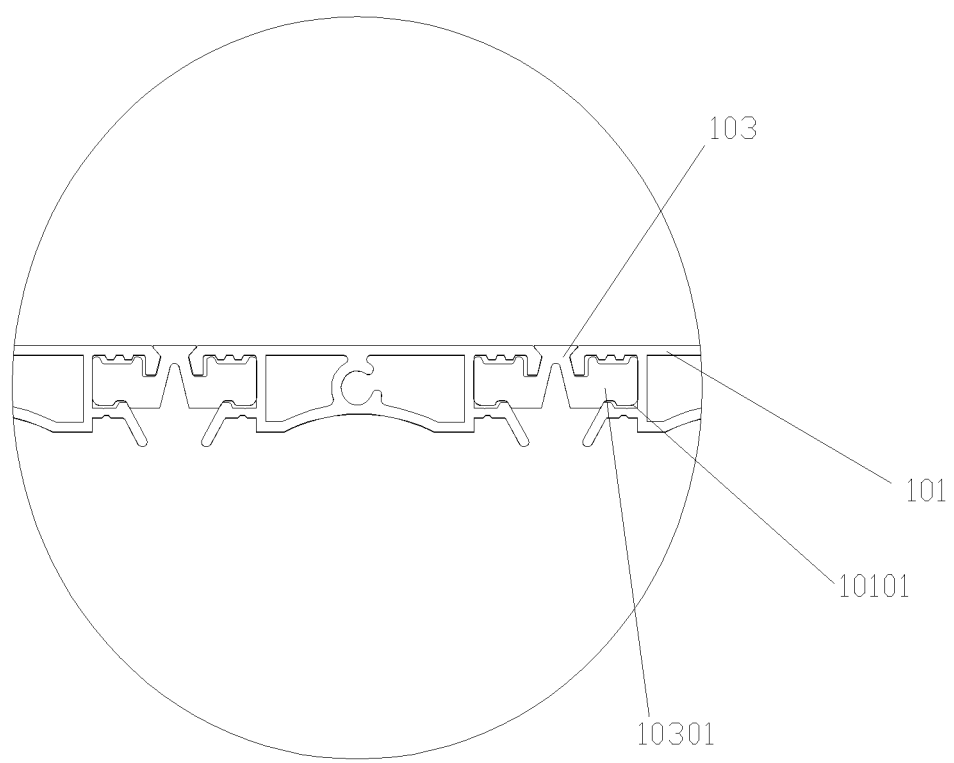
FIG. 5 is a schematic diagram of a matching relationship between profiles and connecting rubber strips.

As shown in FIG. 5, the profile 101 is provided with a fitting groove 10101, the connecting rubber strip 103 is provided with a fitting part 10301, and the fitting part 10301 and the fitting groove 10101 are sealed and fitted together.

The fitting part 10301 is embedded in the fitting groove 10101, and the profile 101 and the connecting rubber strip 103 can be rotated with each other.

As shown in FIGS. 8, 9, 10, 11 and 12, it also includes a pressing member 307 which is fixed on the depressor 301. An end of a torsion spring 303 directly or indirectly abuts against the pressing member 307, and the other end of the torsion spring 303 directly or indirectly abuts against the mounting rod 201.

The pressing member 307 is set to press and adjust the depressor conveniently 301.

Figure 10:
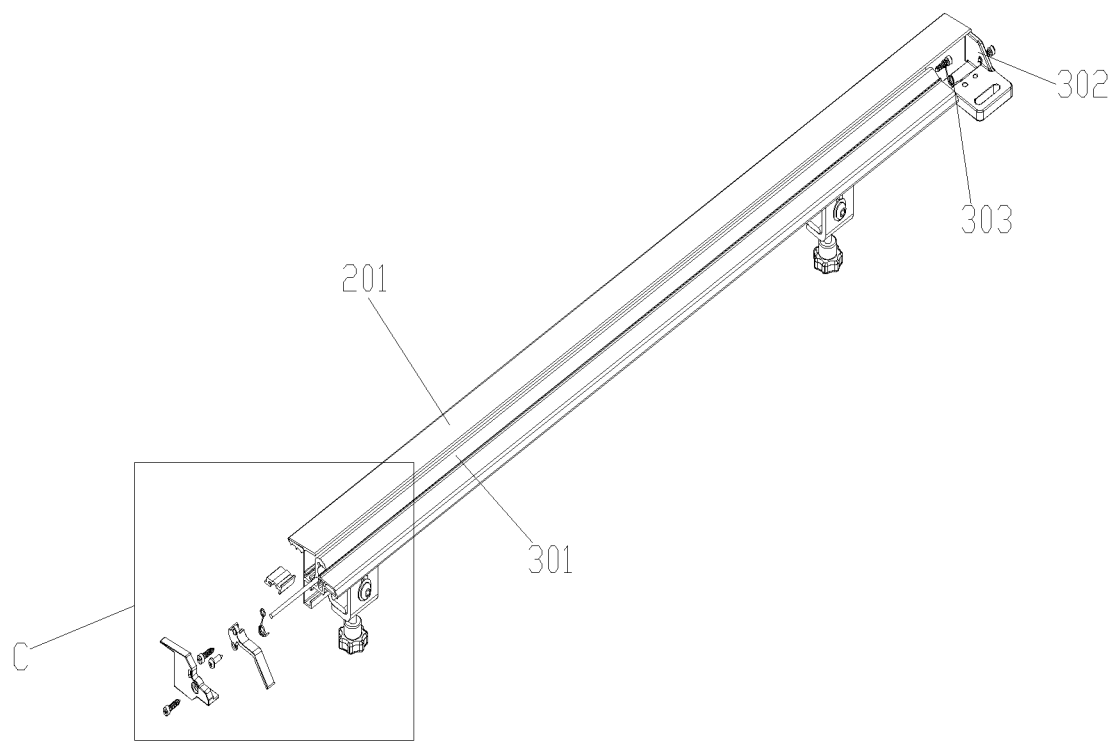
FIG. 10 is a schematic diagram of a connection relationship between various parts on the mounting rod.

As shown in FIG. 10, it also includes an end cap 302 which is installed on the mounting rod 201 and located at an end of the mounting rod 201, and the end cap 302 is used for preventing the pressing member 307 and the depressor 301 from slipping off the mounting rod 201. The end cap 302 is fixed with screws 105.

Figure 12:
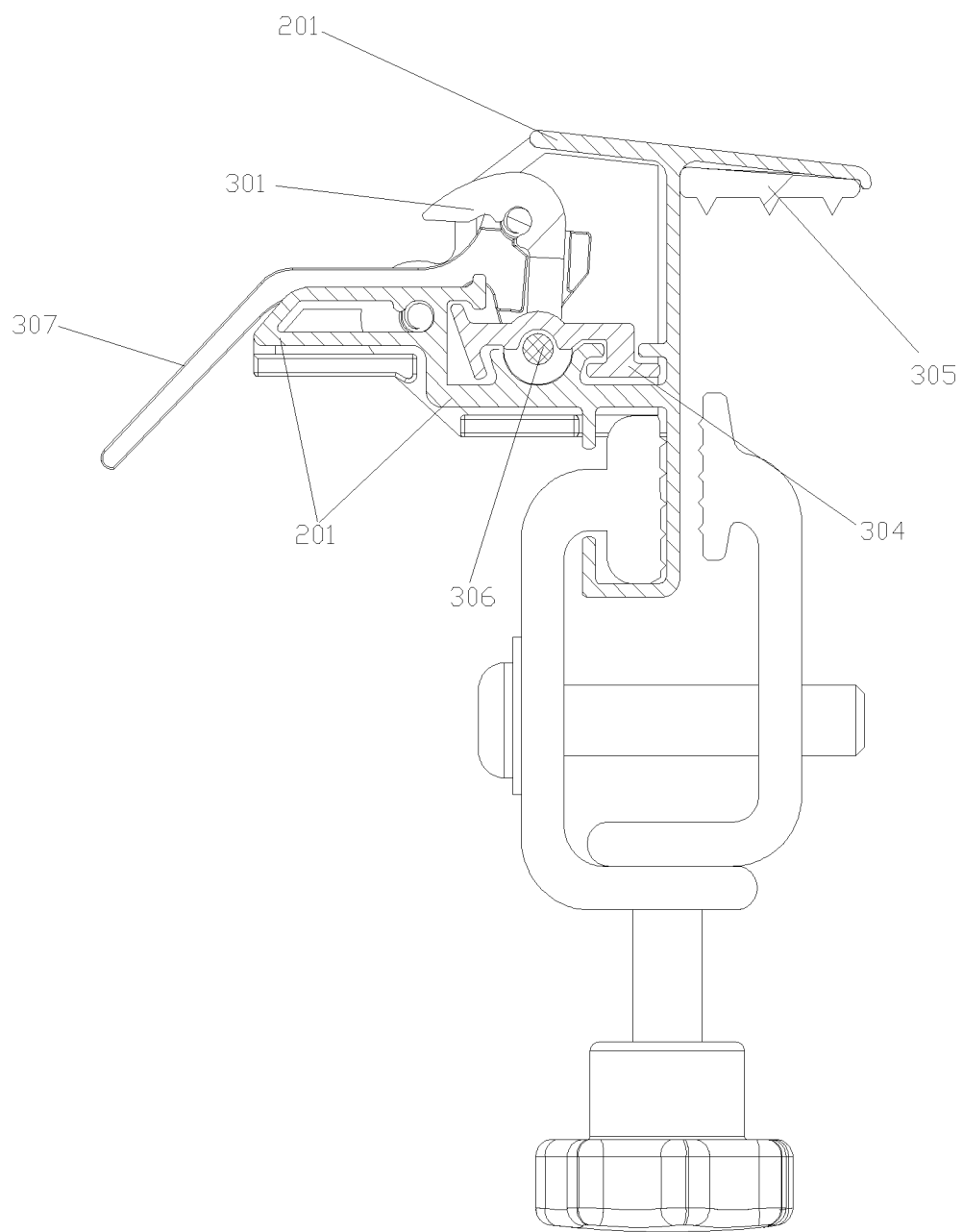
FIG. 12 is a schematic diagram of a matching relationship between the mounting rod and the depressor.

As shown in FIGS. 10 and 12, the end caps 302 are fixedly arranged at two ends of the mounting rod 201, and two torsion springs 301 are respectively arranged at two ends of the depressor 301.

Two torsion springs 303 are set to improve a stability of the depressor 301 during rotation. Specifically, an end of the torsion spring 303 can abut against the pressing member 307 or depressor 301, and the other end of the torsion spring 303 can abut against the mounting rod 201 or the end cap 302.

Figure 11:
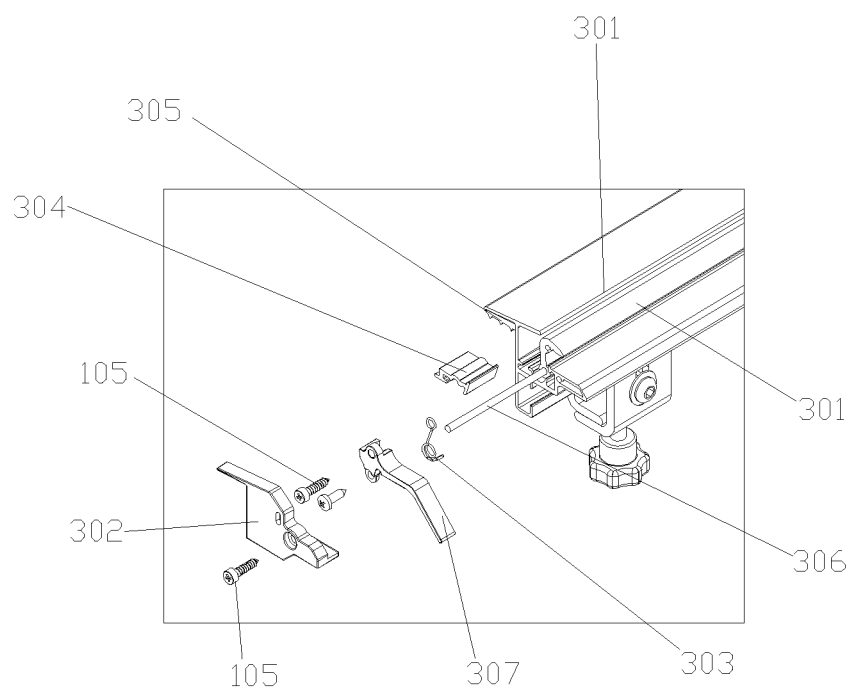
FIG. 11 is an enlarged schematic diagram at C in FIG. 10.

As shown in FIGS. 11 and 12, it also includes a steel wire bar 306 and a stop block 304. The steel wire bar 306 is fixed on the stop block 304 and is parallel to the depressor and the mounting rod 201.

The stop block 304 is arranged on the mounting rod 201. The steel wire bar 306 is rotationally clamped between the stop block 304 and the mounting rods 201.

Specifically, the limit block 304 is slidably clamped on the mounting rod 201, and can slide over a certain distance on the mounting rod 201. However, due to a blocking effect of the end cap 302 or the pressing member 307, the limit block 304 cannot slide out of the mounting rod 201, thus reducing friction resistance between the steel wire strip 306 and the limit block 304 during rotation of the depressor 301, and making the depressor 301 rotate more smoothly. Specifically, the mounting rod 201 is also provided with a mounting rubber strip 305, and when the mounting rod 201 is installed on the cargo bed of the pickup truck, the mounting rubber strip 305 on the mounting rod 201 are closely attached to the cargo bed of the pickup truck.

Figure 8:
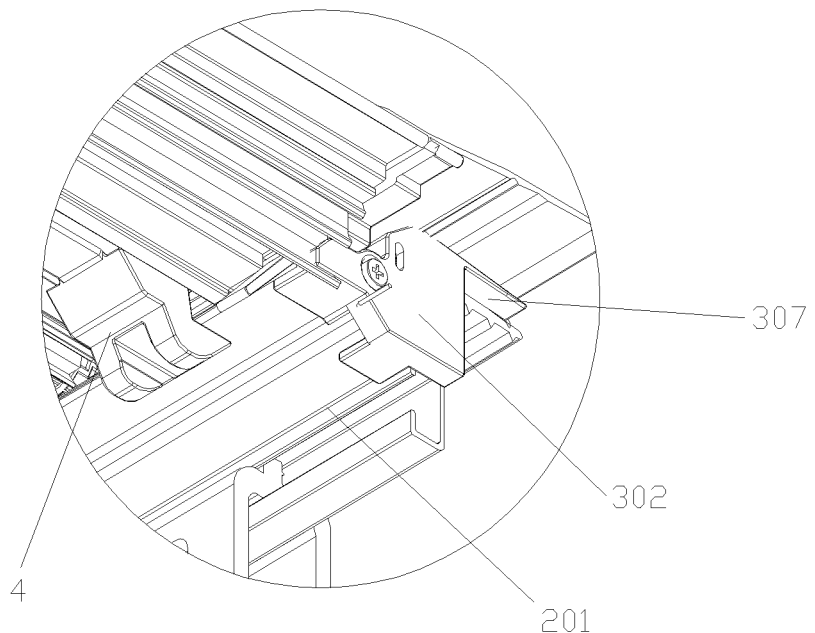
FIG. 8 is an enlarged schematic diagram at D in FIG. 6.

As shown in FIG. 8, it also includes a lock tongue 4 which is elastically installed on the vehicle cover through a spring, and the lock tongue 4 cooperates with the vehicle cover to clamp the mounting rod 201.

The lock tongue 4 functions to lock the vehicle cover, so that a cooperation between the vehicle cover and the mounting rod 201 is more stable.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. A fully-embedded vehicle cover, comprising at least two mounting rods and a vehicle cover, the mounting rods being parallel to each other and the vehicle cover being laid on the mounting rods,
wherein the fully-embedded vehicle cover further comprises a front railing and a depressor,
wherein the front railing is fixed on the vehicle cover and perpendicular to the mounting rods, the front railing is detachably matched with the mounting rods, and the depressor is rotatably mounted on the mounting rods, is parallel to the mounting rod, and cooperates with the mounting rod to clamp the vehicle cover.

2. The fully-embedded vehicle cover according to claim 1, further comprising a fixed bolt, a first slider, a second slider and a locking nut,
wherein the first slider is slidably arranged on the front railing, the fixed bolt is arranged on the first slider, the locking nut is matched with the fixed bolt, a sliding hole is defined in the second slider, the fixed bolt passes through the sliding hole in the second slider, the locking nut abuts against the second slider, and the second slider cooperates with the front railing to clamp the mounting rods.

3. The fully-embedded vehicle cover according to claim 1, further comprising a buckle, a rubber gasket and a front railing rubber strip, wherein the buckle is fixedly arranged on the front railing, the rubber gasket is arranged on the buckle, and the front railing rubber strip is inserted and fixed on the front railing.

4. The fully-embedded vehicle cover according to claim 1, wherein the vehicle cover comprises a plurality of profiles, a plurality of connecting rubber strips, an edge rubber strip, a first joint and a second joint, wherein the profiles are rotationally sealed and fixed together through the connecting rubber strips, the edge rubber strip is fixed on the profiles through the first joint and the second joint, the edge rubber strip is perpendicular to the connecting rubber strips, and the connecting rubber strips are parallel to the profiles; the depressor and the mounting rod are used for clamping the first joint and the second joint, and the edge rubber strip is provided with a flat adhesive surface, and the flat adhesive surface is sealed, adhered and fixed with the connecting rubber strips and the profiles.

5. The fully-embedded vehicle cover according to claim 4, wherein each profile is provided with a fitting groove, each connecting rubber strip is provided with a fitting part, and the fitting part and the fitting groove are sealed and fitted together.

6. The fully-embedded vehicle cover according to claim 1, further comprising a pressing member which is fixed on the depressor, and a torsion spring wherein its one end directly or indirectly abutting against the pressing member, and the other end of the torsion spring directly or indirectly abutting against the mounting rod.

7. The fully-embedded vehicle cover according to claim 6, further comprising an end cap which is installed on the mounting rod and located at an end of the mounting rod, wherein the end cap is used for preventing the pressing member and the depressor from slipping off the mounting rod.

8. The fully-embedded vehicle cover according to claim 6, wherein end caps are fixedly arranged at two ends of the mounting rod, and two torsion springs are respectively arranged at two ends of the depressor.

9. The fully-embedded vehicle cover according to claim 1, further comprising includes a steel wire bar and a stop block, wherein the steel wire bar is fixed on the stop block and is parallel to the depressor and the mounting rod, the stop block is arranged on the mounting rod, and the steel wire bar is rotationally clamped between the stop block and the mounting rods.

10. The fully-embedded vehicle cover according to claim 1, further comprising a lock tongue which is elastically installed on the vehicle cover through a spring, wherein the lock tongue cooperates with the vehicle cover to clamp the mounting rod.

* * * * *